United States Patent
Gariepy et al.

(10) Patent No.: US 11,225,275 B2
(45) Date of Patent: Jan. 18, 2022

(54) METHOD, SYSTEM AND APPARATUS FOR SELF-DRIVING VEHICLE OBSTACLE AVOIDANCE

(71) Applicant: CLEARPATH ROBOTICS INC., Kitchener (CA)

(72) Inventors: Ryan Christopher Gariepy, Kitchener (CA); Alex Bencz, Kitchener (CA); Yan Ma, Kitchener (CA); Michael Irvine, Kitchener (CA); Shahab Kaynama, Mountain View, CA (US); James Servos, Kitchener (CA); Peiyi Chen, Kitchener (CA)

(73) Assignee: CLEARPATH ROBOTICS INC., Kitchener (CA)

( * ) Notice: Subject to any disclaimer, the term of this patent is extended or adjusted under 35 U.S.C. 154(b) by 0 days.

(21) Appl. No.: 17/016,478

(22) Filed: Sep. 10, 2020

(65) Prior Publication Data

US 2021/0061323 A1    Mar. 4, 2021

Related U.S. Application Data

(63) Continuation of application No. 15/906,654, filed on Feb. 27, 2018, now Pat. No. 10,814,891, which is a (Continued)

(51) Int. Cl.
*B61L 3/00* (2006.01)
*G05D 1/00* (2006.01)
(Continued)

(52) U.S. Cl.
CPC ............... *B61L 3/006* (2013.01); *B61L 3/008* (2013.01); *B61L 15/0072* (2013.01); (Continued)

(58) Field of Classification Search
CPC ...... B61L 3/006; B61L 3/008; B61L 15/0072; G05D 1/0238; G05D 1/0066; G05D 1/0088; G05D 2201/0212
(Continued)

(56) References Cited

U.S. PATENT DOCUMENTS

5,581,250 A   12/1996 Khvilivitzky
5,700,074 A   12/1997 Sugimoto et al.
(Continued)

*Primary Examiner* — Muhammad Shafi
(74) *Attorney, Agent, or Firm* — Bereskin & Parr LLP/S.E.N.C.R.L., s.r.l.

(57) ABSTRACT

A system for path control for a mobile unmanned vehicle in an environment is provided. The system includes: a sensor connected to the mobile unmanned vehicle; the mobile unmanned vehicle configured to initiate a first fail-safe routine responsive to detection of an object in a first sensor region adjacent to the sensor; and a processor connected to the mobile unmanned vehicle. The processor is configured to: generate a current path based on a map of the environment; based on the current path, issue velocity commands to cause the mobile unmanned vehicle to execute the current path; responsive to detection of an obstacle in a second sensor region, initiate a second fail-safe routine in the mobile unmanned vehicle to avoid entry of the obstacle into the first sensor region and initiation of the first fail-safe routine.

18 Claims, 8 Drawing Sheets

Related U.S. Application Data continuation of application No. 15/164,280, filed on May 25, 2016, now Pat. No. 9,963,155.

(60) Provisional application No. 62/168,532, filed on May 29, 2015.

(51) Int. Cl.
  *B61L 15/00* (2006.01)
  *G05D 1/02* (2020.01)

(52) U.S. Cl.
  CPC ......... *G05D 1/0066* (2013.01); *G05D 1/0088* (2013.01); *G05D 1/0238* (2013.01); *G05D 2201/0212* (2013.01)

(58) Field of Classification Search
  USPC ............................................................ 701/19
  See application file for complete search history.

(56) References Cited

U.S. PATENT DOCUMENTS

| | | | |
|---|---|---|---|
| 5,795,281 A | 7/1998 | Peter et al. | |
| 5,806,938 A | 9/1998 | Stumpe et al. | |
| 5,983,161 A | 11/1999 | Lemelson et al. | |
| 6,405,132 B1 | 6/2002 | Breed et al. | |
| 9,102,406 B2 | 8/2015 | Stark et al. | |
| 9,141,109 B1 | 9/2015 | Kamata | |
| 9,187,088 B1* | 11/2015 | Ferguson | B60W 30/09 |
| 9,383,753 B1 | 7/2016 | Templeton et al. | |
| 9,442,487 B1* | 9/2016 | Ferguson | G05D 1/0231 |
| 9,671,791 B1 | 6/2017 | Paczan | |
| 9,779,314 B1* | 10/2017 | Wendel | G06K 9/00825 |
| 9,896,030 B2 | 2/2018 | Sugimoto | |
| 10,328,942 B2 | 6/2019 | Kelly et al. | |
| 10,446,034 B2 | 10/2019 | Akamine et al. | |
| 2002/0013651 A1 | 1/2002 | Weiberle et al. | |
| 2004/0204803 A1 | 10/2004 | Matsuda et al. | |
| 2005/0023052 A1 | 2/2005 | Beck et al. | |
| 2007/0106473 A1 | 5/2007 | Bodin et al. | |
| 2008/0018472 A1 | 1/2008 | Dasilva | |
| 2009/0210109 A1 | 8/2009 | Ravenscroft | |
| 2009/0222134 A1 | 9/2009 | Franke et al. | |
| 2011/0015844 A1 | 1/2011 | Perkins et al. | |
| 2011/0021310 A1 | 1/2011 | Kresse et al. | |
| 2012/0310466 A1 | 12/2012 | Fairfield et al. | |
| 2013/0142393 A1 | 6/2013 | Lord et al. | |
| 2013/0144480 A1 | 6/2013 | Kobayashi et al. | |
| 2013/0253770 A1 | 9/2013 | Nishikawa et al. | |
| 2013/0311075 A1 | 11/2013 | Tran et al. | |
| 2014/0214255 A1 | 7/2014 | Dolgov et al. | |
| 2014/0277888 A1 | 9/2014 | Dastoor et al. | |
| 2015/0046034 A1 | 2/2015 | Kikuchi | |
| 2015/0161872 A1 | 6/2015 | Beaulieu et al. | |
| 2015/0239442 A1 | 8/2015 | Yamakado et al. | |
| 2015/0251658 A1 | 9/2015 | Kato | |
| 2015/0266487 A1 | 9/2015 | Kato | |
| 2015/0269860 A1 | 9/2015 | Shaw et al. | |
| 2015/0291210 A1 | 10/2015 | Kageyama | |
| 2016/0001775 A1* | 1/2016 | Wilhelm | B60W 40/04 701/25 |
| 2016/0068267 A1 | 3/2016 | Liu et al. | |
| 2016/0193999 A1* | 7/2016 | Sasabuchi | G08G 1/166 701/301 |
| 2016/0250930 A1 | 9/2016 | Collins et al. | |
| 2016/0304198 A1 | 10/2016 | Jourdan | |
| 2016/0318445 A1 | 11/2016 | Sugimoto | |
| 2017/0036771 A1 | 2/2017 | Woodman et al. | |
| 2017/0076616 A1 | 3/2017 | Kanade et al. | |
| 2017/0102241 A1 | 4/2017 | Paduano et al. | |
| 2017/0158178 A1 | 6/2017 | Kerber et al. | |
| 2017/0188510 A1 | 7/2017 | Einecke et al. | |
| 2017/0355360 A1 | 12/2017 | Reed et al. | |
| 2018/0162349 A1 | 6/2018 | Chang et al. | |
| 2018/0211536 A1 | 7/2018 | Akamine et al. | |
| 2018/0264950 A1 | 9/2018 | Yokoyama et al. | |
| 2018/0297585 A1 | 10/2018 | Lian et al. | |
| 2019/0092347 A1 | 3/2019 | Kim | |
| 2019/0120951 A1 | 4/2019 | Fischer | |
| 2019/0202465 A1 | 7/2019 | Kato et al. | |
| 2019/0344796 A1 | 11/2019 | Lian et al. | |

\* cited by examiner

METHOD, SYSTEM AND APPARATUS FOR SELF-DRIVING VEHICLE OBSTACLE AVOIDANCE

CROSS-REFERENCE TO RELATED APPLICATIONS

This application is a continuation of U.S. patent application Ser. No. 15/906,654, filed Feb. 27, 2018, and entitled METHOD, SYSTEM AND APPARATUS FOR SELF-DRIVING VEHICLE OBSTACLE AVOIDANCE, which is a continuation of U.S. patent application Ser. No. 15/164,280, filed 25 May 2016, and entitled "METHOD, SYSTEM AND APPARATUS FOR PATH CONTROL IN UNMANNED VEHICLES", which claims the benefit of priority from U.S. Provisional Patent Application No. 62/168,532, filed 29 May 2015 and entitled "METHOD, SYSTEM AND APPARATUS FOR PATH CONTROL IN UNMANNED VEHICLES". The contents of each of the foregoing are hereby incorporated by reference.

FIELD

The specification relates generally to mobile unmanned vehicles, and specifically to a method, system and apparatus for path control in such unmanned vehicles.

BACKGROUND

Mobile unmanned vehicles operate in a variety of environments, which may contain obstacles, including equipment, human personnel and the like. Unmanned vehicles are therefore often equipped with safety sensors, such as proximity sensors; when an object trips the vehicle's proximity sensor, the vehicle can trigger a fail-safe routine. The fail-safe routine may be, for example, a emergency stop, in which the vehicle immediately ceases all movement. In the event of such an emergency stop, however, the vehicle may require a manual override by a human operator to resume operation. Current safety mechanisms, such as emergency stops, can therefore be time-consuming and inefficient.

SUMMARY

In general, the specification is directed to systems, methods and apparatuses for path control in self-driving vehicles, also referred to as mobile unmanned vehicles. One or both of a self-driving vehicle and a computing device connected to the self-driving vehicle via a network can set sensor regions adjacent to the vehicle, and monitor those regions for obstacles. Upon detection of an obstacle within the larger of the two regions, the vehicle can initiate a redirection routine to generate a path around the obstacle. During the computation of such a path, the vehicle can reduce its velocity to reduce the likelihood of the obstacle entering the smaller of the two regions. If an obstacle is detected with the smaller region, the vehicle initiates an emergency stop routine.

According to an aspect of the specification, a system for path control for a mobile unmanned vehicle in an environment is provided, comprising: a sensor connected to the mobile unmanned vehicle; the mobile unmanned vehicle configured to initiate a first fail-safe routine responsive to detection of an object in a first sensor region adjacent to the sensor; and a processor connected to the mobile unmanned vehicle, the processor configured to: generate a current path based on a map of the environment; based on the current path, issue velocity commands to cause the mobile unmanned vehicle to execute the current path; responsive to detection of an obstacle in a second sensor region, initiate a second fail-safe routine in the mobile unmanned vehicle to avoid entry of the obstacle into the first sensor region and initiation of the first fail-safe routine.

BRIEF DESCRIPTIONS OF THE DRAWINGS

Embodiments are described with reference to the following figures, in which.

DETAILED DESCRIPTION OF THE EMBODIMENTS

Figure 1:
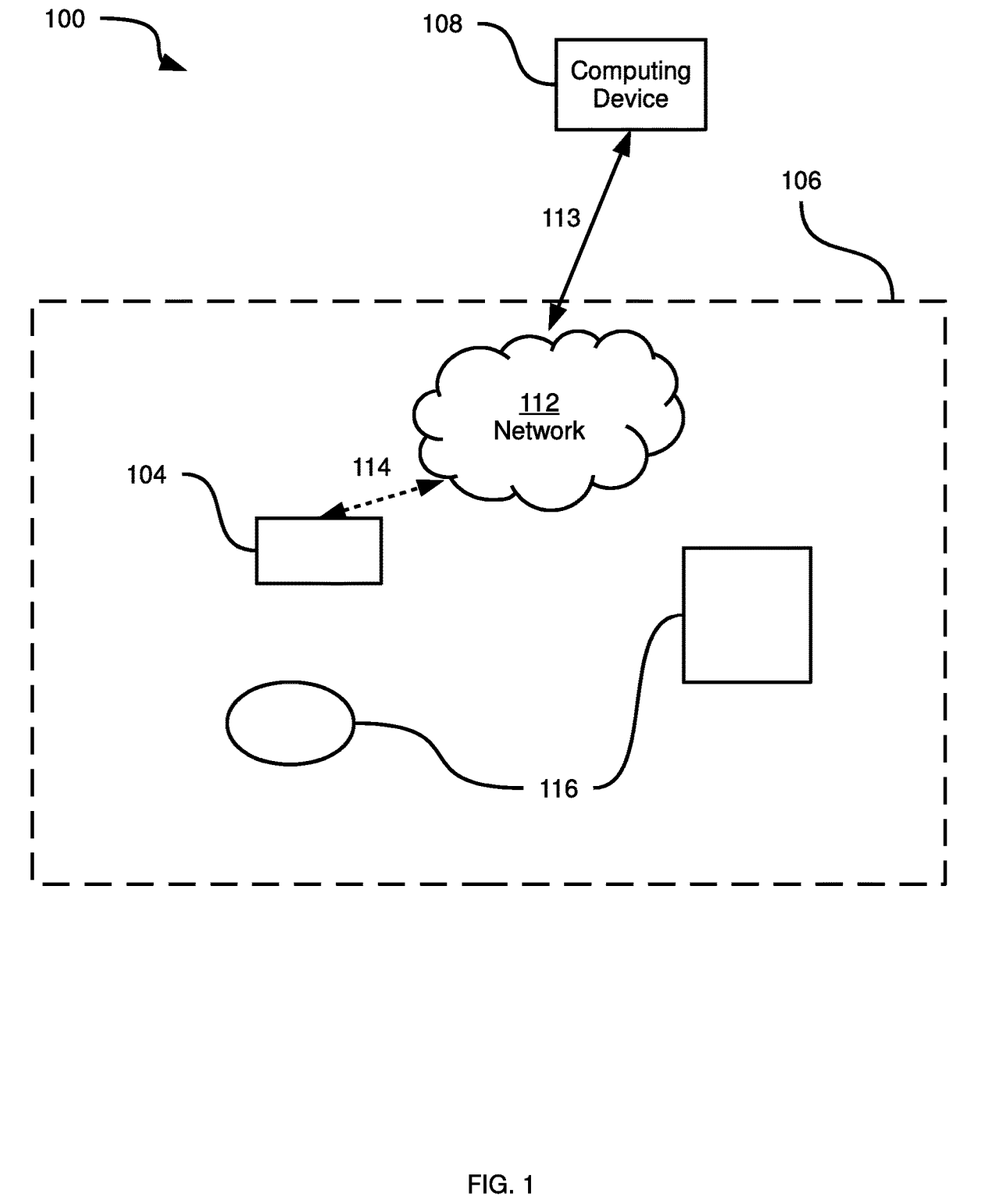
FIG. 1 depicts a system for controlling unmanned vehicles, according to a non-limiting embodiment.

FIG. 1 depicts a system 100 including at least one of self-driving vehicle, also referred to as a mobile unmanned vehicle 104, for deployment in a facility 106. A plurality of unmanned vehicles 104 can be provided in system 100, having a wide variety of operational characteristics (e.g. maximum payload, dimensions, weight, maximum speed, battery life, and the like). Facility 106 can include any one of, or any suitable combination of, a single building, a combination of buildings, an outdoor area, and the like.

System 100 also includes a computing device 108 for connection to unmanned vehicle 104 via a network 112. Computing device 108 can be connected to network 112 via, for example, a wired link 113, although wired link 113 can be any suitable combination of wired and wireless links in other embodiments. Unmanned vehicle 104 can be connected to network 112 via a wireless link 114. Link 114 can be any suitable combination of wired and wireless links in other examples, although generally a wireless link is preferable to reduce or eliminate obstacles to the free movement of unmanned vehicle 104 about facility 106. Network 112 can be any suitable one of, or any suitable combination of, wired and wireless networks, including local area networks (LAN or WLAN), wide area networks (WAN) such as the Internet, and mobile networks (e.g. GSM, LTE and the like). Although computing device 108 is illustrated in FIG. 1 as being outside facility 106, in some embodiments computing device 108 can be located within facility 106.

Computing device 108 can control unmanned vehicle 104, for example by assigning tasks to unmanned vehicle 104. The nature of such tasks is not particularly limited. For example, computing device 108 can instruct vehicle 104 to proceed to a specified location within facility 106, or to generate a map of facility 106, or a portion thereof (e.g. when facility 106 is a previously unmapped area).

In response to receiving an instruction from computing device 108, vehicle 104 is configured to generate a path representing a combination of vectors and associated locations, leading from the current location of vehicle 104 in order to complete the task contained in the instruction. That is, for each of a set of locations, the path specifies that the vehicle is to travel in a certain direction until the next location is reached. In some embodiments, computing device 108 is configured to assist vehicle 104 in generating the path, or can be configured to generate the path entirely and transmit the generated path to vehicle 104.

Once in possession of the path mentioned above, vehicle 104 is configured to execute the path by controlling motors and the like to implement the vectors specified by the path at their corresponding locations (e.g. implement the first vector, associated with the starting location of vehicle 104, until the second location in the path is reached, at which point vehicle 104 implements the second vector, associated with that second location).

Facility 106 can contain obstacles 116, two examples of which are shown in FIG. 1. As will now be apparent to those skilled in the art, the path mentioned above preferably routes vehicle 104 around obstacles 116 to avoid collisions. For example, the generation of the path can be based on map data that defines the locations and dimensions of obstacles 116. Such map data can be created previously and stored at vehicle 104 or computing device 108 (or both). In some embodiments, the map data can be captured by vehicle 104 via various sensors configured to detect obstacles 116.

In some situations, however, one or more of obstacles is not accounted for by the above-mentioned map data (e.g. the map is incomplete). In addition, it is possible for some obstacles, such as other vehicles, human operators and the like, to move, thus rendering their indicated positions in the map (if they were represented in the map) inaccurate. As will be discussed in greater detail below, vehicle 104 is configured to perform various actions to reduce or eliminate the likelihood of collisions with objects not accounted for in the path, while also reducing or eliminating interruptions in the completion of vehicle 104's tasks.

Before describing the path control actions implemented by vehicle 104, certain components of vehicle 104, as well as certain internal components of computing device 108, will be described.

Figure 2:
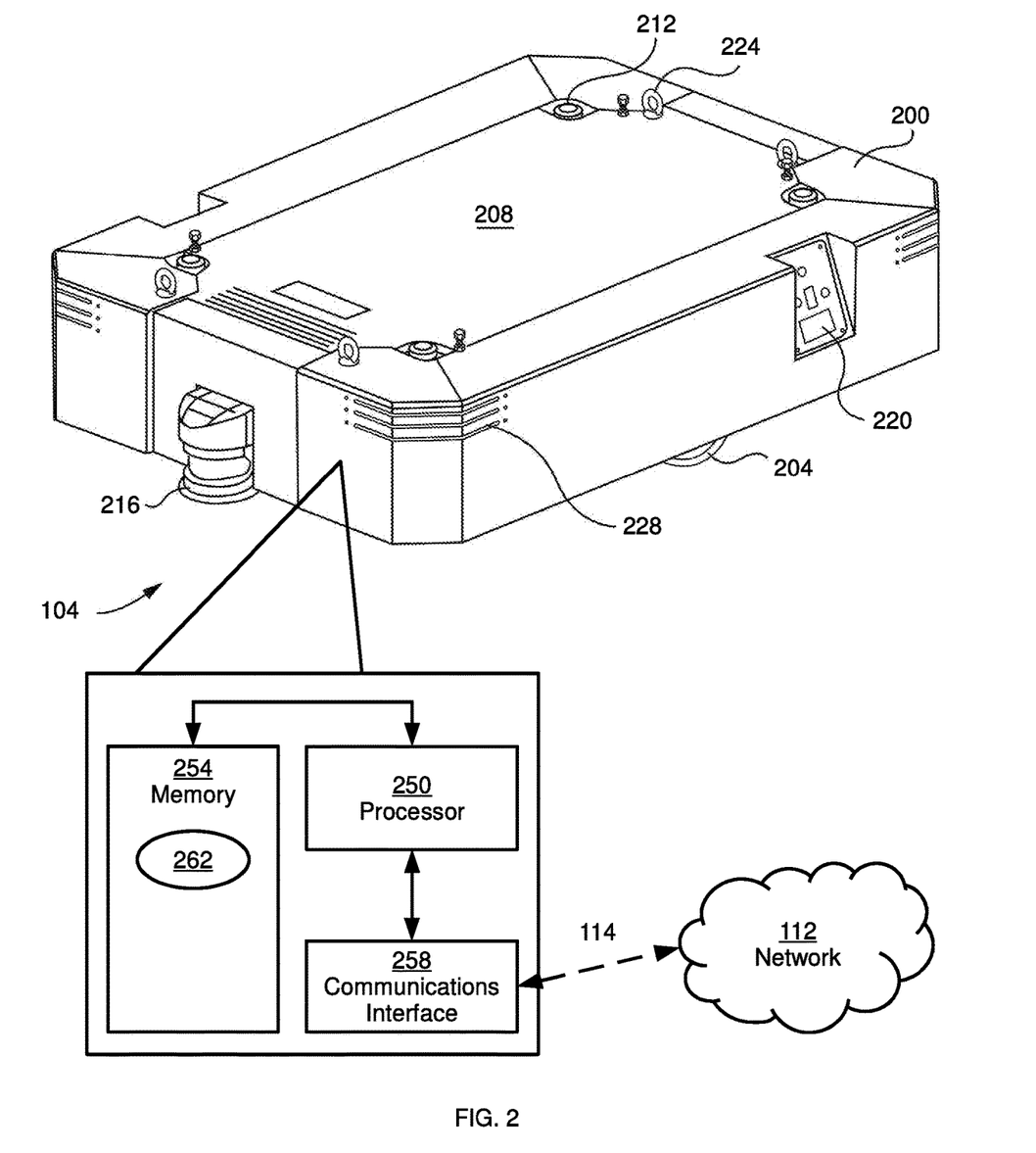
FIG. 2 depicts certain components of the unmanned vehicle of the system of FIG. 1, according to a non-limiting embodiment.

Referring now to FIG. 2, an example implementation of mobile unmanned vehicle 104 is shown. Vehicle 104 is depicted as a terrestrial vehicle, although it is contemplated that vehicle 104 (or any other unmanned vehicle deployed within facility 106) can also include aerial vehicles and watercraft. Vehicle 104 includes a chassis 200 containing or otherwise supporting various other components, including one or more locomotive devices 204. Devices 204 in the present example are wheels, although in other embodiments any suitable locomotive device, or combination thereof, may be employed (e.g. tracks, propellers, and the like).

Locomotive devices 204 are powered by one or more motors (not shown) contained within chassis 200. The motors of unmanned vehicle 104 can be electric motors, internal combustion engines, or any other suitable motor or combination of motors. In general, the motors drive the locomotive devices 204 by drawing power from an energy storage device (not shown) supported on or within chassis 200. The nature of the energy storage device can vary based on the nature of the motors. For example, the energy storage can include batteries, combustible fuel tanks, or any suitable combination thereof.

Unmanned vehicle 104 also includes a load-bearing surface 208 (also referred to as a payload surface), for carrying one or more items. In some examples, payload surface 208 can be replaced or supplemented with other payload-bearing equipment, such as a cradle, a manipulator arm, or the like. In still other examples, payload surface 208, as well as any other payload-bearing equipment, can be omitted.

Vehicle 104 can also include a variety of sensors. For example, vehicle 104 can include at least one load cell 212 coupled to payload surface 208, for measuring a force exerted on payload surface 208 (e.g. by an item being carried by vehicle 104). Unmanned vehicle 104 can also include a location sensor (not shown) such as a GPS sensor, for detecting the location of unmanned vehicle 104 with respect to a frame of reference. The frame of reference is not particularly limited, and may be, for example, a global frame of reference (e.g. GPS coordinates), or a facility-specific frame of reference. Other sensors that can be provided with unmanned vehicle 104 include accelerometers, fuel-level or battery-level sensors, and the like.

Vehicle 104 also includes at least one machine vision sensor 216 for detecting objects in the surroundings of vehicle 104. For example, vehicle 104 can include any suitable one of, or any suitable combination of, laser-based sensing devices (e.g. a LIDAR sensor), cameras and the like. In other embodiments, sonar-based sensors may be employed instead of, or in addition to, optical devices (that is, "machine vision" is used herein in a broad sense to denote sensors that permit vehicle 104 to sense physical features of its environment). A particular example of sensor 216 is a safety sensor such as the S3000 laser scanner by Sick AG. The actions performed by vehicle 104, described below, may be performed using a single sensor, or a plurality of sensors.

Unmanned vehicle 104 can also include a control panel 220, as well as anchors 224 for securing items or other equipment to chassis 200, or for lifting chassis 200 (e.g. for maintenance). Unmanned vehicle 104 can also include any of a variety of other features, such as indicator lights 228.

In addition, unmanned vehicle 104 includes a central processing unit (CPU) 250, also referred to as a processor 250, interconnected with a non-transitory computer-readable medium such as a memory 254. Processor 250 and memory 254 are generally comprised of one or more integrated circuits (ICs), and can have a variety of structures, as will now occur to those skilled in the art (for example, more than one CPU can be provided). Memory 254 can be any suitable combination of volatile (e.g. Random Access Memory ("RAM")) and non-volatile (e.g. read only memory ("ROM"), Electrically Erasable Programmable Read Only Memory ("EEPROM"), flash memory, magnetic computer storage device, or optical disc) memory.

Unmanned vehicle 104 also includes a communications interface 258 (e.g. a network interface controller or NIC) interconnected with processor 250. Via communications interface 258, link 114 and network 112, processor 250 can send and receive data to and from computing device 108. For example, unmanned vehicle 104 can send updated location data to computing device 108, and receive task instructions from computing device 108.

Additionally, processor 250 is interconnected with the other components of unmanned vehicle 104 mentioned above, such as sensors 212 and 216 and control panel 220.

Memory 254 stores a plurality of computer-readable programming instructions, executable by processor 250, in the form of various applications, including a vehicle control application 262. As will be understood by those skilled in the art, processor 250 can execute the instructions of application 262 (and any other suitable applications stored in memory 254) in order to perform various actions defined within the instructions. In the description below processor 250, and more generally vehicle 104, is said to be "configured to" perform certain actions. It will be understood that vehicle 104 is so configured via the execution of the instructions of the applications stored in memory 254.

Figure 3:
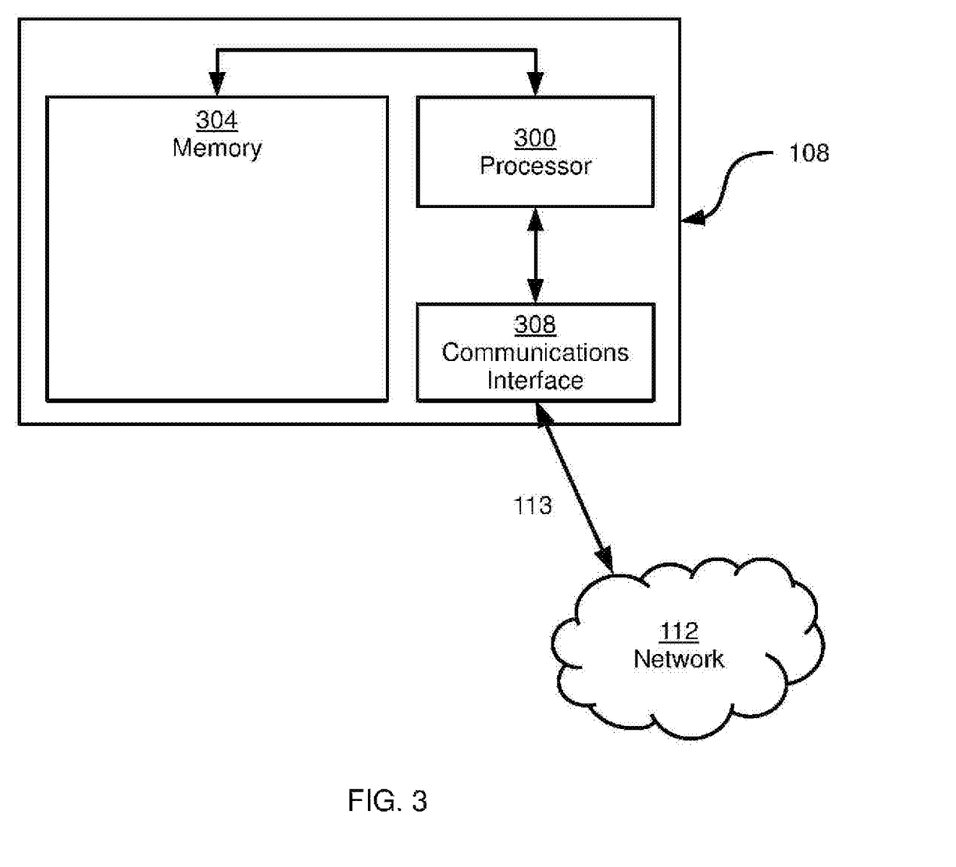
FIG. 3 depicts certain internal components of the computing device of the system of FIG. 1, according to a non-limiting embodiment.

Turning now to FIG. 3, certain internal components of computing device 108 are illustrated. Computing device 108 can be any one of, or any combination of, a variety of computing devices. Such devices include desktop computers, servers, mobile computers such as laptops and tablet computers, and the like. Computing device 108 therefore includes at least one central processing unit (CPU), also referred to herein as a processor, 300. Processor 300 is interconnected with a non-transitory computer-readable medium such as a memory 304. Processor 300 is also interconnected with a communications interface 308.

Processor 300 and memory 304 are generally comprised of one or more integrated circuits (ICs), and can have a variety of structures, as will now occur to those skilled in the art (for example, more than one CPU can be provided). Memory 304 can be any suitable combination of volatile (e.g. Random Access Memory ("RAM")) and non-volatile (e.g. read only memory ("ROM"), Electrically Erasable Programmable Read Only Memory ("EEPROM"), flash memory, magnetic computer storage device, or optical disc) memory.

Communications interface 308 allows computing device 108 to connect with other computing devices (e.g. unmanned vehicle 104) via network 112. Communications interface 308 therefore includes any necessary hardware (e.g. network interface controllers (NICs), radio units, and the like) to communicate with network 112 over link 113. Computing device 108 can also include input and output devices, such as keyboards, mice, displays, and the like (not shown).

Memory 304 stores a plurality of computer-readable programming instructions, executable by processor 300, in the form of various applications. As will be understood by those skilled in the art, processor 300 can execute the instructions of such applications in order to perform various actions defined within the instructions. In the description below processor 300, and more generally computing device 108, are said to be "configured to" perform those actions. It will be understood that they are so configured via the execution of the instructions of the applications stored in memory 304.

Figure 4:
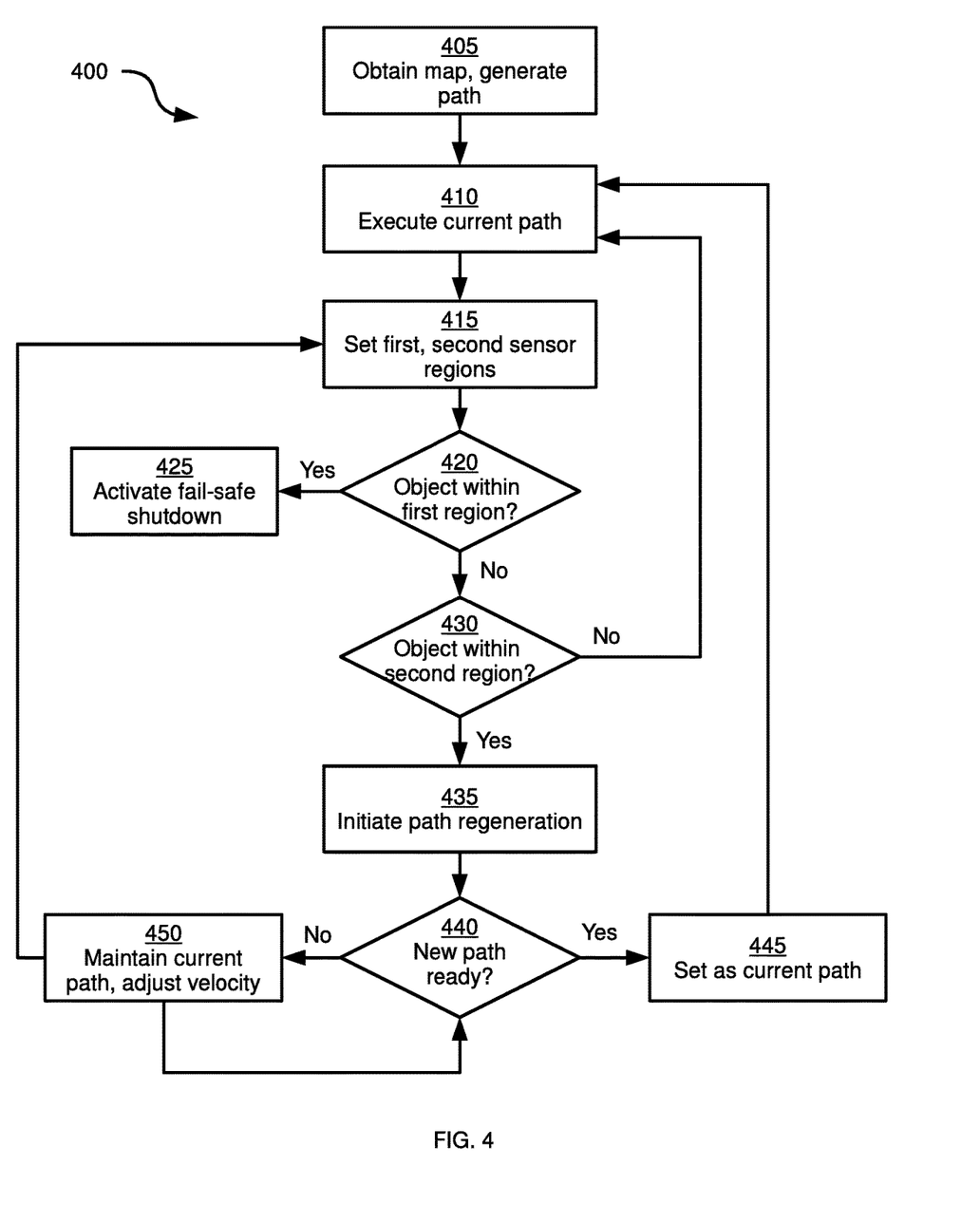
FIG. 4 depicts a method for path control in the system of FIG. 1, according to a non-limiting embodiment.

Turning now to FIG. 4, a method 400 of path control in unmanned vehicles is illustrated. Method 400 will be described in connection with its performance in system 100, although it is contemplated that method 400 can also be performed in other systems. More specifically, the blocks of method 400 are performed by vehicle 104, via the execution of application 262 by processor 250, in conjunction with the other components of vehicle 104.

Beginning at block 405, vehicle 104 is configured to obtain a map of facility 106 (or a portion thereof) and generate a path. The generation of a path may be performed in response to the receipt of an instruction to perform a task at vehicle 104 from computing device 108, for example. Obtaining a map can be performed in a variety of ways. For example, vehicle 104 can send a request to computing device 108 via network 112 for a map (stored in memory 304). In another example, vehicle 104 can store a map of facility 106 in memory 254, and thus obtaining the map at block 405 includes retrieving the map from memory 254. In a further example, obtaining a map can include generating a map based on sensor data received at processor 250 from sensor 216. That is, vehicle 104 can be configured to construct a map of its surroundings using sensor 216, and generate a path based on that map.

In general, to generate a path at block 405, vehicle 104 (and more specifically, processor 250) generates one or more direction indicators, each corresponding to a location within the map. Each direction indicator defines a direction of travel to be implemented by vehicle 104 when vehicle 104 reaches the location corresponding to that direction indicator. As will now be apparent to those skilled in the art, vehicle 104 is configured to monitor its current location within the map. Vehicle 104 can therefore determine when it has reached the starting location for the next segment of the path, and in response can control locomotive devices 204 to travel in the direction specified by the path for that segment.

Figure 5:
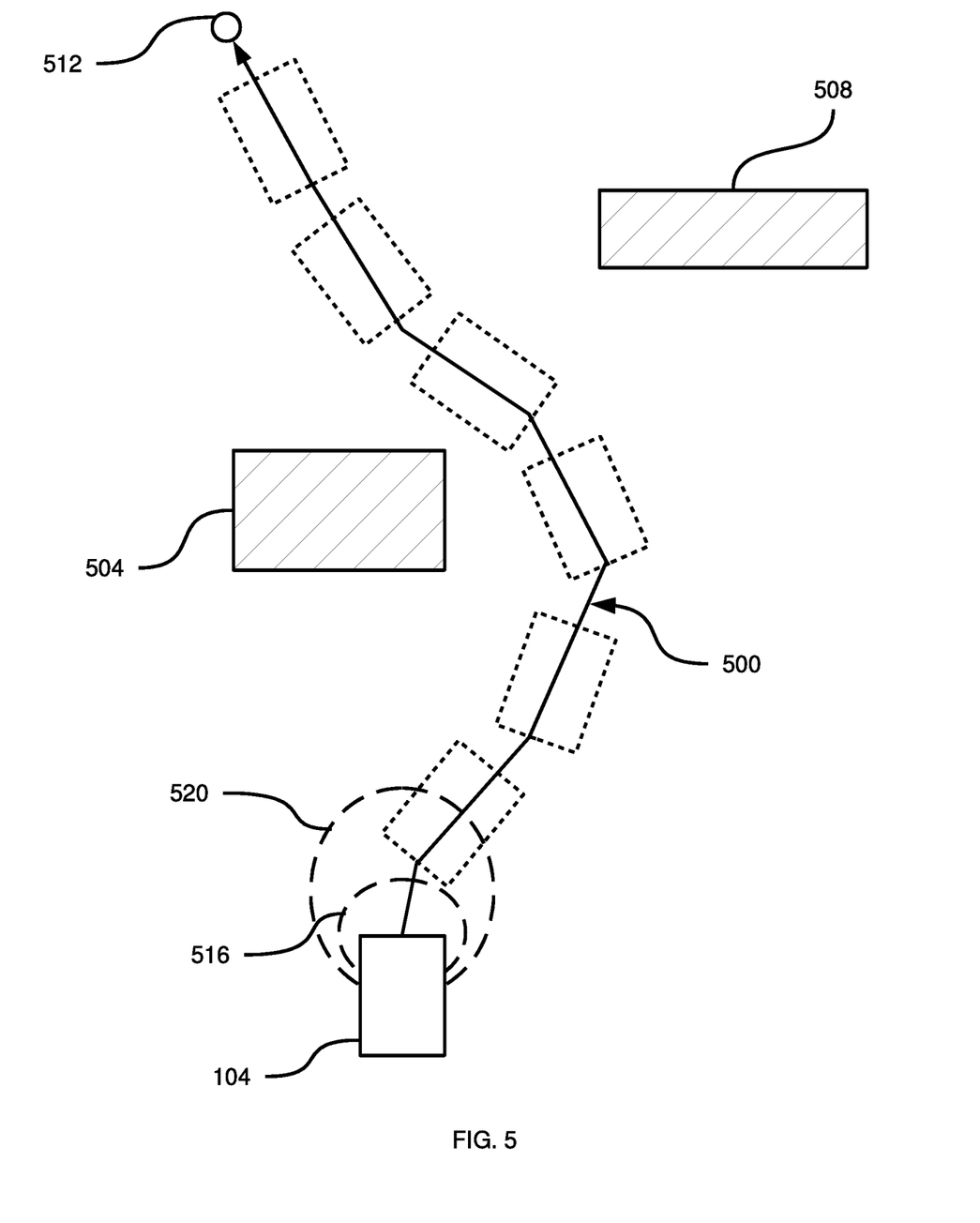
FIG. 5 depicts a path generated in the performance of the method of FIG. 4, according to a non-limiting embodiment.

Turning to FIG. 5, an example path 500 is depicted as a plurality of segments, each indicating a different direction in which vehicle 104 will travel. Sample future locations of vehicle 104 (as vehicle 104 travels along path 500) are also shown, in dotted lines. As seen in FIG. 5, path 500 routes vehicle 104 between two obstacles 504 and 508 to arrive at a target location 512. For example, target location 512 may have been supplied to vehicle 104 by computing device 108, and obstacles 504 and 508 can be represented in a map either also supplied by computing device 108, or constructed by vehicle 104 using data from sensor 216.

Returning to FIG. 4, at block 410, vehicle 104 is configured to execute the path generated at block 405. In general, path execution includes selecting a segment (that is, a direction indication and corresponding starting location for the segment, as mentioned above) in the path, and controlling locomotive devices 204 and associated components (such as motors) to travel in the direction defined by the direction indication for that segment. Path execution begins by selecting the first segment, and continues by repeating the above process for subsequent nodes. Each time the starting location for the next segment in the path is reached, vehicle 104 sets a direction of travel (by controlling locomotive devices 204) based on the direction indication for that next segment, until vehicle 104 reaches a location corresponding to the subsequent segment in the path.

Executing the path at block 410 also includes setting a speed of travel for each segment of the path, in addition to a direction. In some embodiments, the speed can be set during path generation and therefore specified directly in the path (with each segment of the path thus being defined by a location, a direction and a speed). In the present example, however, the speed is set dynamically by vehicle 104 during path execution. Speed of travel can be set in a variety of ways. For example, vehicle 104 may simply select the maximum speed of which vehicle 104 is capable. In other examples, vehicle 104 can apply restrictions (such as speed limits) stored in memory 254 to the speed selected. In further examples, vehicle 104 can vary the speed based on operational parameters that are required to conform with the path. For example, when the path requires vehicle 104 to make a turn, vehicle 104 may be configured to select a lower speed for the duration of the turn. As a further example, vehicle 104 may be configured to select the speed and direction to return to the current path, when the current position or velocity (or both) of vehicle 104 indicate that vehicle 104 is not on the current path.

In some embodiments, setting a speed includes setting a target speed value (e.g. fifteen kilometres per hour). Processor 250 can receive measurements of the current speed of vehicle 104 from sensors (not shown), and adjust control parameters, such as motor power provided to locomotive devices 204, until the target speed is reached. In other embodiments, setting a speed at block 410 can include not setting an actual target speed value, but rather setting control parameters such as motor power (e.g. as a percentage of maximum motor power).

More generally, processor 250 is configured to execute path 410 by generating and issuing successive velocity commands for each segment of the path generated at block 405. Each velocity command includes a direction of travel and a speed of travel (either in the form of a target speed or related control parameters). Processor 250, or other devices within vehicle 104 (such as controllers connected to locomotive devices 204), are configured to convert the velocity commands into control inputs to locomotive devices 204 in order to carry out the velocity commands.

At block 415, during the execution of the path generated at block 405, vehicle 104 is configured to set first and second sensor regions. As will be apparent in the description below, the sensor regions are set in parallel with the execution of the path, since the nature of the sensor regions depends on the velocity commands generated by processor 250 during path execution.

The first and second sensor regions are employed by processor 250 to initiate respective first and second fail-safe routines in vehicle 104. Machine vision sensors such as sensor 216 provide processor 250 with data defining distances between vehicle 104 and objects in the vicinity of vehicle 104. Such distances can be defined as distances from sensor 216 itself, or sensor 216 can process the data to generate distances from the center of mass of vehicle 104 or any other portion of vehicle 104. The above-mentioned sensor regions are effectively distance thresholds that processor 250 can apply to the data received from sensor 216 in order to initiate the above-mentioned fail-safe routines.

As will be discussed below, when an object is detected (either by processor 250, within the first sensor region in the data received from sensor 216, or by sensor 216 itself), processor 250 or sensor 216 triggers a first fail-safe routine, also referred to as a shutdown or emergency stop routine. In the first fail-safe routine, vehicle 104 is brought to a halt and resumes operation only after an override instruction is received (e.g. from a human operator). On the other hand, when processor 250 detects, within the data received from sensor 216, an object within the second sensor region, processor 250 triggers a second routine, also referred to herein as a second fail-safe routine (although the second fail-safe routine need not include any redundancy or other fail-safe features) that does not bring vehicle 104 to an emergency stop, but rather adjusts the operation of vehicle 104 to reduce the likelihood of an emergency stop being triggered.

The first and second sensor regions are defined at least by a range parameter, indicating a distance from sensor 216 or any other suitable portion of vehicle 104. For each sensor region, processor 250 takes no action when objects are detected outside the set range in the data received from sensor 216, and does take action when objects are detected within that range. Sensor regions can also be defined by additional parameters, such as angles, coordinates and the like to define fields of view; thus, sensor regions can be areas (two-dimensional regions), or volumes (three-dimensional regions). The above-mentioned range parameter can also vary with direction, such that the sensor regions are shaped, for example to be larger in a forward direction than in sideways directions.

Processor 250 is configured to set the range of the first sensor region to provide sufficient time for vehicle 104 to come to a halt before colliding with an object detected within the first sensor region. Thus, the range for the first sensor region is selected based on the stopping distance of vehicle 104, and preferably is greater than the stopping distance of vehicle 104. Processor 250 is configured to set a range for the second sensor region that is greater than the range of the first sensor region. For example, the second sensor region can be set as a predetermined multiple of the stopping distance of vehicle 104 (e.g. twice the stopping distance), or as the stopping distance supplemented with a distance that vehicle 104 will travel in a predetermined amount of time at its current speed. In other embodiments, the second sensor region can be set as a predetermined multiple of the first sensor region.

It is clear from the above that the range of each sensor region (and any other parameters of the sensor regions) are set based on the speed of vehicle 104 (both translational and rotational speed can be considered). Processor 250 can receive measurements of the current speed of vehicle 104 from sensors (e.g. sensors coupled to locomotive devices 204, or location sensors such as GPS sensors). From a measurement of vehicle speed, processor 250 determines a stopping distance for vehicle 104, and sets the first sensor region accordingly. Processor 250 also sets the second sensor region based on the measured speed, as noted above.

Referring to FIG. 5, an example first sensor region 516, and an example second sensor region 520, are illustrated. In the present example, sensor regions 516 and 520 are biased in the direction of forward travel of vehicle 104; in other embodiments, various other shapes can be employed for the sensor regions.

In some embodiments, rather than selecting parameters for sensor regions, processor 250 can instead instruct sensor 216 (or any other sensors employed to implement the sensor region) to operate in one of a plurality of discrete sensing modes. For example, sensor 216 can be configured to operate in three modes, each with a different fixed range within which objects will be reported to processor 250 (objects outside the range may be detected by sensor 216, but sensor 216 may not notify processor 250 of those objects). Processor 250 can therefore select an operating mode based on the current speed of vehicle 104, and send an instruction to sensor 216 to operate in that mode.

Returning to FIG. 4 and proceeding to block 420, during path execution, processor 250 is configured to receive data from sensor 216 (e.g. indicating distances from sensor 216 to any objects visible to sensor 216), and to determine from the received data whether an object is detected within the first sensor region. The determination at block 420 can be, for example, whether a distance reading received from sensor 216 is smaller than the range of the first sensor region as set at block 415. In other embodiments, the determination at block 420 can be made based on the map. For example, vehicle 104 may update the map with objects detected by sensor 216 during path execution, and the determination at block 420 can therefore be based on the map rather than directly on the sensor data. In further embodiments, sensor 216 may implement the first sensor region by operating in a mode in which only objects within the first sensor region are even reported to processor 250. Thus, the determination at block 420 can also include simply determining whether any data has been received from sensor 216 in connection with the first sensor region. When the determination is affirmative, performance of method 400 proceeds to block 425.

At block 425, processor 250 initiates the first fail-safe routine, in the form of an emergency stop, in which vehicle 104 is brought to a halt via control of locomotive devices 204 overriding any previous velocity command. Performance of method 400 is then terminated. Referring briefly to FIG. 5, it is clear that at the beginning of path execution, no objects will be detected within first sensor region 516.

In some embodiments, blocks 420 and 425 can be performed by a separate subsystem of vehicle 104 instead of processor 250, such as a safety-rated (e.g. redundant) subsystem configured to respond to object detections by sensor 216. Such a subsystem can be included within sensor 216 itself, and thus sensor 216 can perform block 420 directly and effectively override the control of vehicle 104 by processor 250 when an object is detected within the first sensor region. In such embodiments, block 415 can also be performed in part by the subsystem. For example, the subsystem can set the first sensor region, while processor 250 can set the second sensor region.

When the determination at block 420 is negative, however, vehicle 104 proceeds to block 430. At block 430, vehicle 104 determines whether an object is detected within the (larger) second sensor region. The determination at block 430 is similar to the determination at block 420, in that processor 250 is configured to determine whether any data received from sensor 216 indicates the presence of an object at a range smaller than the range of the second sensor region. In FIG. 5, it can be seen that no objects will be detected within the second sensor region 520 at vehicle 104's current position. When the determination at block 430 is negative, performance of method 400 returns to block 410. That is, path execution (and any adjustments to the sensor regions based on changing speed of travel) continues.

Figure 6:
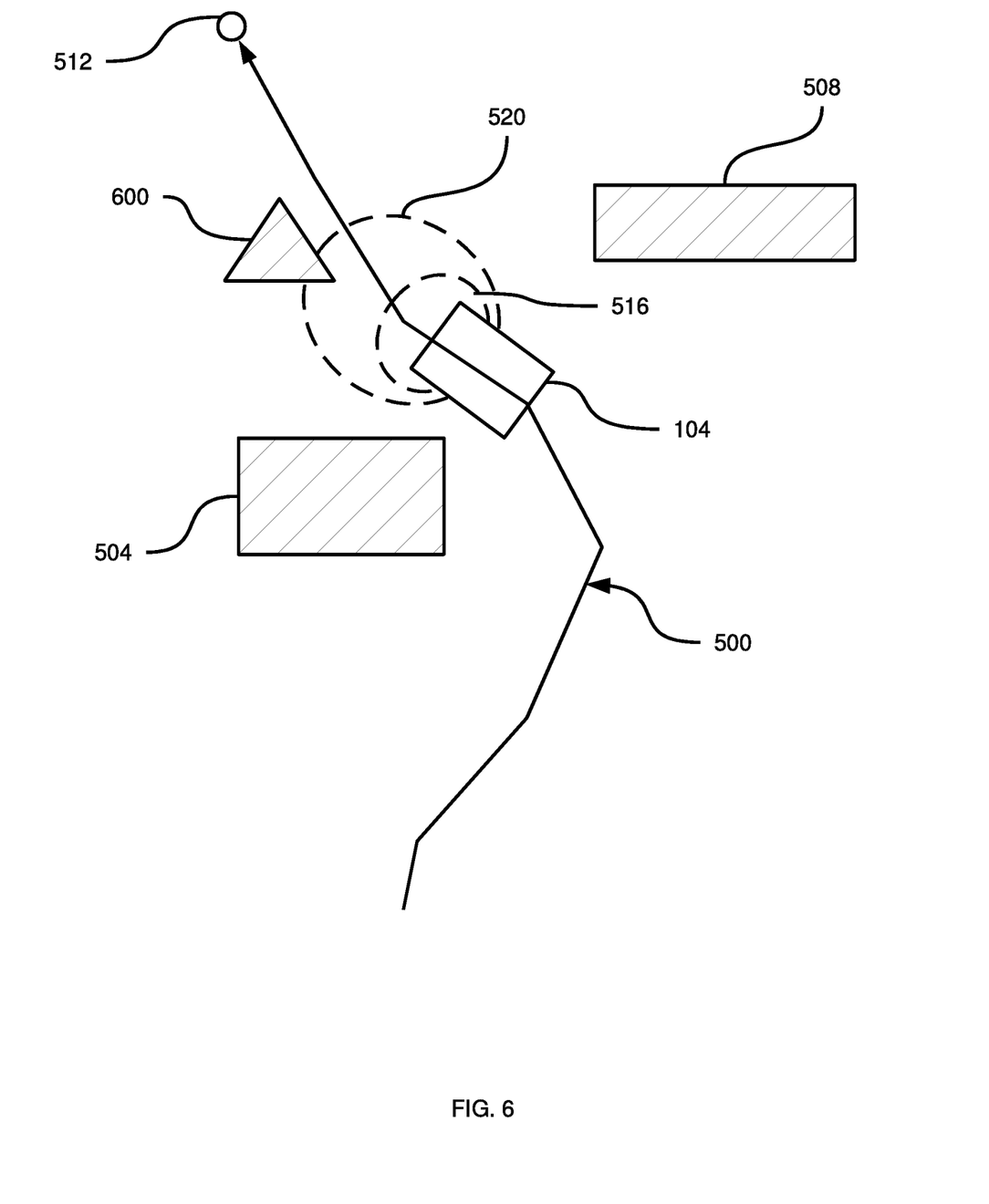
FIG. 6 depicts the partial execution of the path of FIG. 5, and detection of an obstacle, according to a non-limiting embodiment.

When the determination at block 430 is affirmative, however, the performance of method 400 proceeds to block 435. Turning to FIG. 6, vehicle 104 is shown to have completed execution of a portion of path 500. In FIG. 6, however, an additional obstacle 600 is present. Obstacle 600 may be a moveable object that was not in its present location when path 500 was generated. Obstacle 600 may also be an object that, although stationary, was simply not accounted for in the map employed to generate block 500. For example, if the map was obtained by vehicle 104 in its initial position shown in FIG. 5, obstacle 600 may have been initially obscured from view by obstacle 504.

As seen in FIG. 6, a portion of obstacle 600 is within second sensor region 520, leading to an affirmative determination at block 430. The presence of obstacle 600 in second sensor region 520 indicates that there is a risk that obstacle 600 could enter first sensor region 516 and trigger an emergency stop in vehicle 104. Returning to FIG. 4, at block 435 vehicle 104 is configured to take various actions to reduce or eliminate that risk. These actions, in general, correspond to the second fail-safe routine mentioned earlier.

At block 435, vehicle 104 is configured to initiate a path regeneration, taking into account the object detected at block 430. The path regeneration process initiated at block 435 is similar to the path generation at block 405, with the exception that the newly detected obstacle (obstacle 600, in the example shown in FIG. 6) is accounted for.

The generation of a path can be computationally intensive, and may therefore not be ready immediately. Further, in some instances a new path may not be possible to generate. That is, the obstacle detected at block 430 may prevent any path to the original target location from being generated. In order to reduce interruptions to the operation of vehicle 104 (that is, in completing the task of travelling to target location 512), while also reducing or eliminating the risk of colliding with obstacle 600 (which, as is evident from FIG. 6, would occur if vehicle 104 continued along path 500), vehicle 104 is therefore configured to perform additional actions as part of the second fail-safe routine.

In particular, at block 440, processor 250 is configured to determine whether the path whose generation was initiated at block 435 is complete. When the determination at block 440 is affirmative, the performance of method 400 proceeds to block 445, at which the new path is set as the current path (superseding the path generated at block 405). Performance of method 400 then resumes at block 410, as described above (with the new path rather than the original path).

When, however, the determination at block 440 is negative, indicating that the new path is not yet ready, performance of method 400 proceeds to block 450. At block 450, processor 250 is configured to maintain the current path but to adjust the velocity of vehicle 104. In other words, at block 450 processor 250 continues to execute the current path in a similar manner to that described above in connection with block 410. However, at block 450 processor 250 sets the speed of vehicle 104 differently than at block 410.

Specifically, at block 450, processor 250 is configured to set a speed that reduces the size of second sensor region 520 sufficiently for the obstacle detected at block 430 (obstacle 600, in the present example) to no longer fall within second sensor region 520. Processor 250 can therefore, as part of the performance of block 450, set a speed and simulate the setting of sensor regions by generating a simulated second sensor region based on the new speed. Processor 250 can then determine whether obstacle 600 would still fall within the simulated second sensor region. If so, processor 250 can select a lower speed and repeat the simulation until a speed is arrived at that results in a sufficiently small second sensor region.

Figure 7:
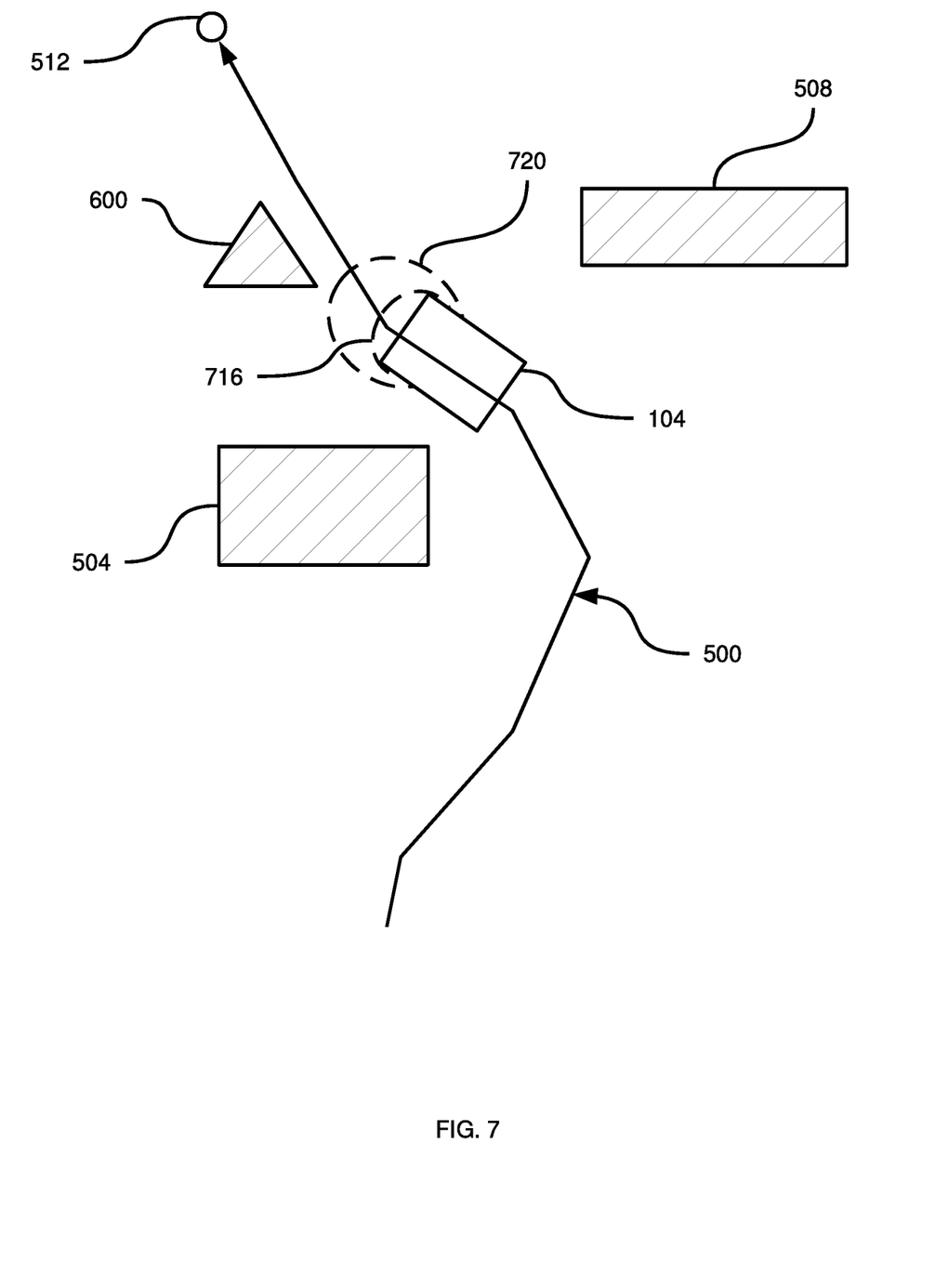
FIG. 7 depicts a second fail-safe routine performed in response to detection of the obstacle of FIG. 6, according to a non-limiting embodiment.

Having performed block 450, vehicle 104 then returns to block 415 to set first and second sensor regions based on the path execution (with adjusted speed) performed at block 450. Referring to FIG. 7, first and second sensor regions 716 and 720 are shown to have replaced sensor regions 516 and 520. As will now be apparent, the reduction in vehicle speed designed to reduce the range of sensor region 720 also causes a reduction in range of sensor region 716, as both sensor regions are based in part on vehicle speed. As seen in FIG. 7, obstacle 600 is no longer within sensor region 720.

Setting the new sensor regions at block 415 can include, as noted earlier, instructing sensor 216 to enter one of a plurality of discrete modes. In some embodiments, sensor 216 maintains speed envelopes (e.g. an upper and lower bound, or an upper bound only) in association with each mode, and does not allow its operation to switch to a given mode unless the speed of vehicle 104 is within the envelope. In such embodiments, having set a target speed at block 450, processor 450 can be configured to wait until the target speed has been reached before performing block 415 to ensure that the instruction to switch sensor modes is not refused.

Upon completion of block 415, vehicle 104 is configured to continue performing the remainder of method 400 as described above. As will now be apparent to those skilled in the art, if obstacle 600 is stationary, and if no new path becomes available, vehicle 104 may again approach obstacle 600 such that obstacle 600 falls within second sensor region 720. In such an event, the performance of method 400 would lead to a further reduction in vehicle speed, to further reduce the range of the sensor regions. In some cases, the speed of vehicle 104 may be reduced to zero while the generation of a new path proceeds. Reducing vehicle speed to zero presents an interruption in the operation of vehicle 104, but because the first fail-safe routine (i.e. emergency stop) has not occurred, resuming operation is still relatively straightforward, in that when the new path is available (or the obstacle detected at block 430 moves away), path execution at block 410 can resume, generally leading to an increase in vehicle speed.

As mentioned above, sensor 216 may have discrete sensor modes for implementing the first sensor region. It is contemplated that when vehicle speed is reduced below a certain extent, sensor 216 may not have a mode with a range short enough to correspond to the speed of vehicle 104. In such embodiments, processor 250 can instruct sensor 216 to disable the first sensor region, or to switch to a docking mode in which collision warnings (i.e. performances of blocks 420 and 425) are suppressed.

Figure 8:
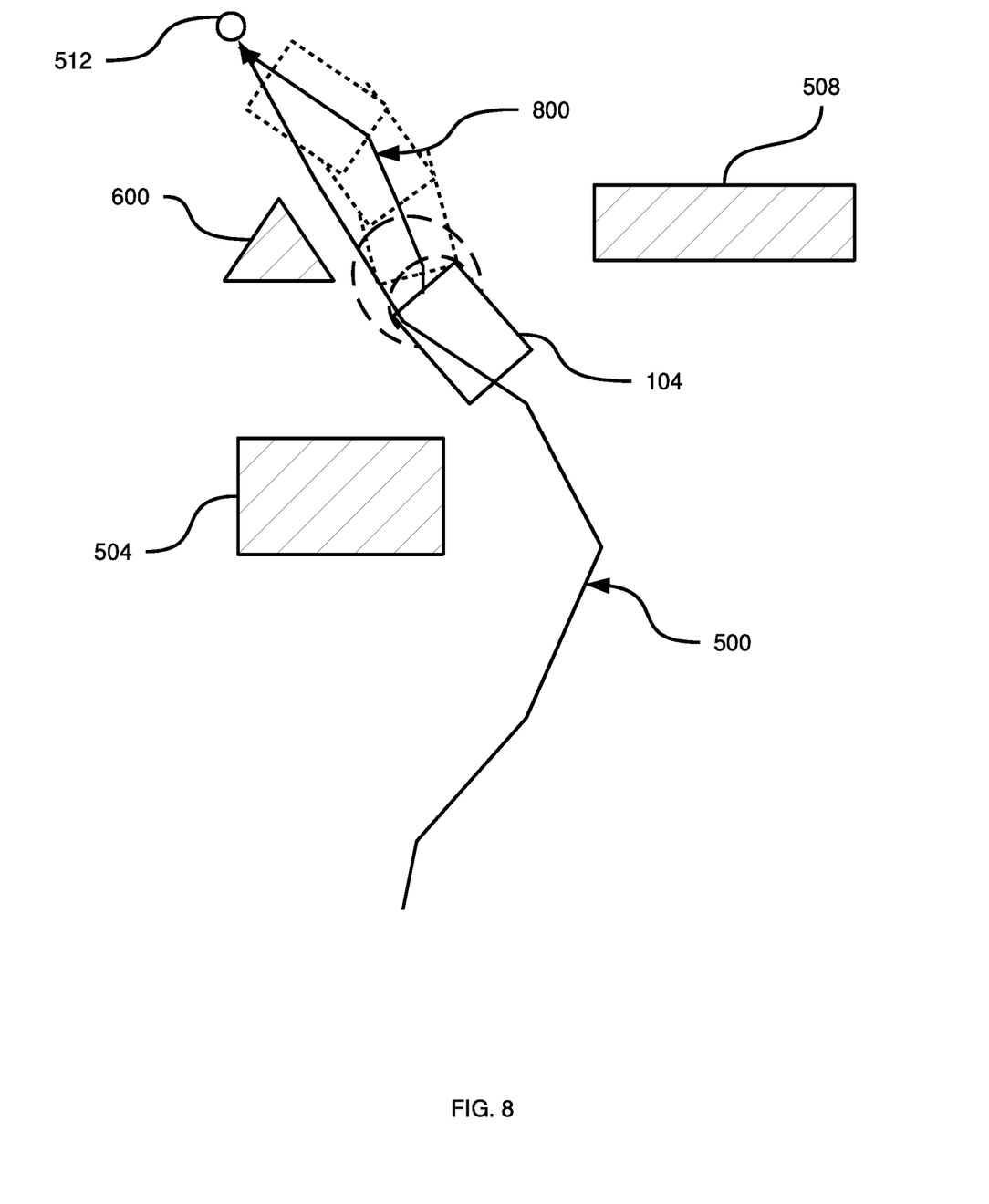
FIG. 8 depicts a further path generated in the performance of the method of FIG. 4, according to a non-limiting embodiment.

When, at any point during the performance of method 400 after block 435 has been performed, the new path becomes available, the new path supersedes the current path, and the performance of method 400 resumes at block 410. Referring now to FIG. 8, a new path 800 is illustrated towards target location 512, that diverges from path 500 and routes vehicle 104 around obstacle 600. Via the execution of path 800, vehicle 104 may therefore arrive at target location 512 without having performed an emergency stop.

Variations to the above system and method are contemplated, in addition to those already mentioned. For example, in some embodiments, portions of method 400 can be performed by computing device 108 instead of vehicle 104. For example, path generation at blocks 405 and 435 can be performed by computing device 108, with the results of the path generation being sent to vehicle 104. In further embodiments, computing device 108 can simply send velocity commands to vehicle 104 rather than the path. In other words, computing device 108 can also perform blocks 410 and 450 (partially).

In further variations, the second sensor region described above may be implemented in various ways. For example, rather than setting a range within which detected obstacles will trigger the second fail-safe routine discussed above, processor 250 (or processor 300 of computing device 108) can generate predictions of the position of vehicle 104 in the future. Such predictions can be based on the path, the current speed of the vehicle and the associated stopping distance of the vehicle.

In other embodiments, the predictions can be based on the current control inputs provided to locomotive devices 204 and the known behaviour of locomotive devices 204 in response to such inputs (e.g. the dynamics of locomotive devices 204). Having generated a predicted position for vehicle 104 at a predetermined future time (e.g. three seconds in the future), processor 250 can then be configured to determine whether, in the predicted position, any obstacles will be within the first sensor region.

Effectively, in the above variations the second sensor region is replaced with a prediction of the future position of vehicle 104, which can include the entire path or a predicted future position of vehicle 104. Such predictions can also take into account the movement of obstacles, therefore generating a prediction not only of the future position of vehicle 104, but also a future position of an obstacle based on the current observed (e.g. via sensor 216) motion of the obstacle. The predictions of the obstacle and vehicle 104 can then be compared to determine whether the obstacle is expected to intersect with the first sensor region of vehicle 104.

In further variations, setting sensor regions can also include directing or steering sensor 216, when sensor 216 is moveable in relation to vehicle 104. For example, when vehicle 104 executes a turn towards the direction of the next segment in the path, sensor 216 can be steered in the same direction as the turn.

The scope of the claims should not be limited by the embodiments set forth in the above examples, but should be given the broadest interpretation consistent with the description as a whole.

We claim:

1. A method for obstacle avoidance for a self-driving vehicle in an environment, the method comprising:
   operating, by a processor of the self-driving vehicle, the vehicle to autonomously navigate the environment, the processor being in communicationwith one or more sensors mounted to the self-driving vehicle, at least one sensor of the one or more sensors is configured to measure rotational velocity data for the vehicle;
   defining, by the processor, a first sensor region and a second sensor region for at least one sensor of the one or more sensors, the at least one sensor being configured to detect an object in the first or second sensor regions, wherein the second sensor region has a greater range than the first sensor region;
   receiving, by the processor from the second sensor, rotational velocity data for the vehicle;
   based on the rotational velocity data, determining, by the processor, that the vehicle is turning along a turn direction;
   in response to determining that the vehicle is turning along the turn direction, adjusting, by the processor, an orientation of at least the first sensor to follow the turn direction while the vehicle is turning;
   based on sensor data generated by the at least one sensor, detecting, by the processor, an object in at least one of the first or second sensor regions; and
   in response to detecting the object in at least one of the first or second sensor regions, adjusting, by the processor, an operation of the self-driving vehicle to reduce a risk of colliding with the object.

2. The method of claim 1, wherein adjusting, by the processor, an orientation of at least the first sensor further comprises at least one of: maintaining constant the orientation of the second sensor, or adjusting the orientation of the second sensor to follow the turn direction.

3. The method of claim 1, wherein the first and second sensor regions correspond to a detection range of the at least one sensor.

4. The method of claim 1, wherein the processor operates the vehicle to follow a vehicle trajectory, the vehicle trajectory comprising a plurality of segments each defining a portion of the vehicle trajectory and having a corresponding segment-specific vehicle travel direction, the method further comprising:
   determining, by the processor, a current location of the vehicle along the vehicle trajectory;
   identifying, by the processor, a current segment corresponding to the current location of the vehicle;
   determining, by the processor, a next segment along the vehicle trajectory that is subsequent to the current segment; and determining, by the processor, that the vehicle is turning based on the segment-specific travel directions for the current segment and the next segment.

5. The method of claim 4, further comprising:
accessing, by the processor, a map of the environment, wherein the map includes information for the plurality of segments and the segment-specific travel directions; and
determining, by the processor, the current segment and the next segment based on the map and the current location of the vehicle.

6. The method of claim 5, wherein the map is stored on a memory coupled to the processor.

7. The method of claim 4, wherein each of the plurality of segments include corresponding segment-specific vehicle speed, and the method further comprises:
determining, by the processor, a current location of the vehicle along the vehicle trajectory;
identifying, by the processor, a segment corresponding to the current location of the vehicle;
determining a segment-specific vehicle speed which corresponds to the identified segment; and
adjusting a range of at least one of the first and second sensor regions based on the segment-specific vehicle speed.

8. The method of claim 1, wherein at least one sensor of the one or more sensors is configured to measure vehicle speed, and the method further comprises:
receiving, by the processor from the second sensor, a vehicle speed; and
adjusting, by the processor, a range of at least one of the first and second sensor regions based on the vehicle speed.

9. The method of claim 1, further comprising:
detecting, by the processor, an object in at least one of the first and second sensor regions; and
in response to detecting the object in the first sensor region, triggering, by the processor, an emergency stop to avoid collision with the object;
otherwise, in response to detecting the object in the second sensor region, generating, by the processor, a vehicle trajectory to avoid the object and operating, by the processor, the vehicle to follow the vehicle trajectory.

10. A system for self-driving vehicle obstacle avoidance in an environment, the system comprising:
a processor connected to the self-driving vehicle;
one or more sensors mounted to the self-driving vehicle and in communication with the processor, at least one sensor of the one or more sensors being configured to detect an object, at least one sensor of the one or more sensors is configured to measure rotational velocity data for the vehicle;
the processor being configured to:
operate the self-driving vehicle to autonomously navigate the environment; define a first sensor region and a second sensor region for the at least one sensor, wherein the second sensor region has a greater range than the first sensor region;
based on the rotational velocity data, determine that the vehicle is turning along a turn direction;
in response to determining that the vehicle is turning along the turn direction, adjust an orientation of at least the first sensor to follow the turn direction while the vehicle is turning;
detect, based on sensor data generated by the at least one sensor, an object in at least one of the first or second sensor regions; and in response to detecting the object in at least one of the first or second sensor regions, adjust an operation of the self-driving vehicle to reduce a risk of colliding with the object.

11. The system of claim 10, wherein adjusting an orientation of at least the first sensor further comprises at least one of: maintain constant the orientation of the second sensor, or adjust the orientation of the second sensor to follow the turn direction.

12. The system of claim 10, wherein the first and second sensor regions correspond to a detection range of the at least one sensor.

13. The system of claim 10, wherein the processor is further configured to:
operate the vehicle to follow a vehicle trajectory, the vehicle trajectory comprising a plurality of segments each defining a portion of the vehicle trajectory and having a corresponding segment-specific vehicle travel direction;
determine a current location of the vehicle along the vehicle trajectory;
identify a current segment corresponding to the current location of the vehicle;
determine a next segment along the vehicle trajectory that is subsequent to the current segment; and
determine that the vehicle is turning based on the segment-specific travel directions for the current segment and the next segment.

14. The system of claim 13, wherein the processor is further configured to:
access a map of the environment, wherein the map includes information for the plurality of segments and the segment-specific travel directions; and
determine the current segment and the next segment based on the map and the current location of the vehicle.

15. The system of claim 14, wherein the system further comprises a memory coupled to the processor, and the map is stored on the memory.

16. The system of claim 13, wherein each of the plurality of segments include corresponding segment-specific vehicle speed, and the processor is further configured to:
determine a current location of the vehicle along the vehicle trajectory;
identify a segment corresponding to the current location of the vehicle;
determine a segment-specific vehicle speed which corresponds to the identified segment; and
adjust a range of at least one of the first and second sensor regions based on the segment-specific vehicle speed.

17. The system of claim 10, wherein at least one sensor of the one or more sensors is configured to measure a vehicle speed, and the processor is further configured to:
adjust a range of at least one of the first and second sensor regions based on the vehicle speed.

18. The system of claim 10, wherein the processor is further configured to:
detect, based on sensor data generated by the at least one sensor, the object in at least one of the first and second sensor regions;
in response to detecting the object in the first sensor region, trigger an emergency stop to avoid collision with the object; and
otherwise, in response to detecting the object in the second sensor region, generate a vehicle trajectory to avoid the object and operate the vehicle to follow the vehicle trajectory.

* * * * *